Dec. 16, 1947. R. G. ROSHONG 2,432,684
LIQUID COOLED SEAL
Filed Sept. 16, 1944
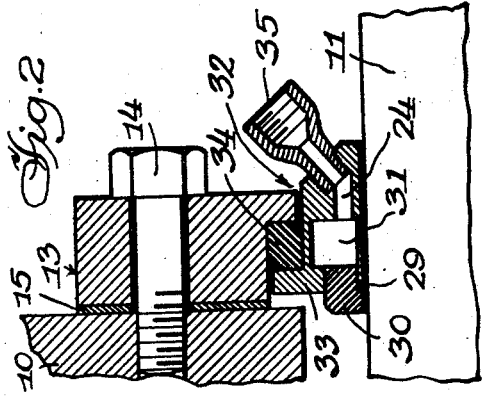
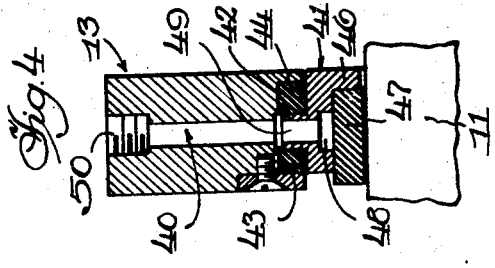
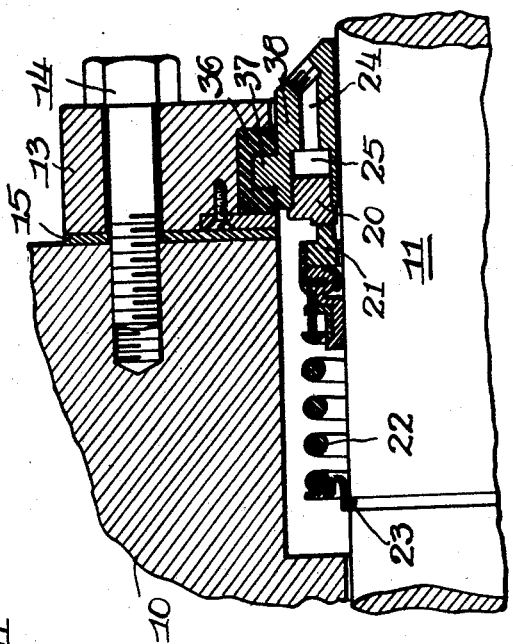
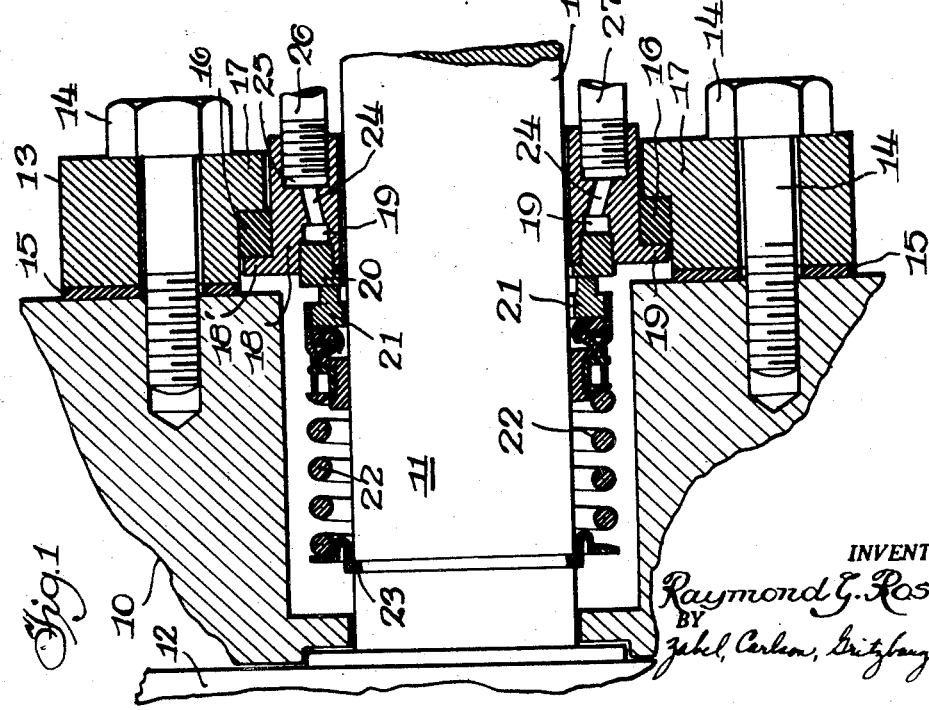
INVENTOR.
Raymond G. Roshong
BY
Zabel, Carlson, Fitzbaugh & Kelly
Attys.

Patented Dec. 16, 1947

2,432,684

UNITED STATES PATENT OFFICE 2,432,684

LIQUID COOLED SEAL

Raymond G. Roshong, Los Angeles, Calif., assignor to Crane Packing Company, Chicago, Ill., a corporation of Illinois Application September 16, 1944, Serial No. 554,487

1 Claim. (Cl. 286—7)

My invention relates to liquid cooled seals for rotatable shafts.

Sealing devices have been developed heretofore for use in centrifugal water pumps and analogous equipment wherein it is necessary to prevent leakage of liquid or gas between relatively rotatable parts, such as the rotating shaft and the bearing in the pump housing. Such seals comprise, generally speaking, two rings concentric with the shaft, one fixed against rotation in the housing, and the other rotatable with said shaft. These rings have smooth, hard anti-friction surfaces or side faces which engage each other and which preferably are out of contact with the shaft, but which are spring pressed toward each other to prevent leakage of liquid or gas into or out of the space immediately surrounding said shaft. One ring may be in the form of a washer of carbon or some special composition such as a thermosetting resin mixed with other substances such as particles of metals or metal alloys and graphite or lead bronze, the stationary part or seat engaged thereby being made of cast iron, Stellite and other materials, having a smooth surface thereon. In some cases the relative arrangement is reversed and the washer is non-rotatable and constitutes the seat. In either case the engaging surfaces of the seats and of the washers are usually ground and lapped to constitute an effective seal when one rotates relatively to the other. In some developments the sealing assembly is formed as a unit which is pressed into a recess in a stationary part, as for example, in the housing of the pump in which the shaft is supported in ball bearings or in other suitable bearings.

Other developments comprise a yielding or resilient gasket such as rubber or the like behind the seat to permit the same to adjust itself to a plane exactly at right angles to the axis of rotation, thus providing for slight misalinement of certain parts without resulting leakage. Under these conditions it is not necessary to provide for a pressed fit of part of the assembly in the supporting wall.

Seals of this general character are referred to as mechanical seals. Some of these operate under high temperature conditions, as for example, in boiler feed pumps where the suction temperature may be about 400°. There are also cases where mechanical seals are expected to operate for 7 or 8 hours without lubrication, or without any liquid around the seal face. As a result excessive temperature develops.

The object of this invention is to provide an improved seal assembly in which a cooling medium is employed to prevent overheating of the friction surfaces as they slide one over the other.

A contributory object is to provide a water cooling system for a mechanical seal of this general character.

A further object is to provide a sealing assembly which includes relatively rotatable members, one of which has a chamber for water or other cooling liquid not far from the anti-friction surface, together with means for causing a flow of cooling liquid through the channel provided for the purpose.

An additional object is to provide relatively fixed and rotatable sealing members, one of which has a yielding backing to provide a floating seal, one of the sealing members having an annular passageway therein through which a cooling liquid may circulate to reduce the temperature.

Other objects and advantages will be apparent from the more detailed description hereinafter given.

In the accompanying drawings I have illustrated several embodiments of the invention which will serve to illustrate the novel features.

Fig. 1 is a sectional elevation of part of a pump housing showing a rotatable shaft and a liquid cooled seal surrounding the same; and Figs. 2, 3 and 4 are partial sectional elevations of modified forms of my invention.

The structure selected for illustration may be assumed to be a centrifugal water pump, the end portion of the housing 10 having a suitable bearing (not shown) for the pump shaft 11. Any suitable form of impeller 12 having the usual blades or vanes thereon is fixed to the shaft to rotate therewith.

An apertured plate or gland 13 is non-rotatably secured to the housing 10 by suitable means such as cap screws 14, a gasket 15 being interposed between the adjacent surfaces, to prevent leakage of fluid pressure, whether of liquid or gas. A ring 16 of rubber or other yieldable material is seated against a shoulder formed by an inwardly extending annular flange 17 on said plate 13, and a similar ring 18 which may be of metal or other suitable material has an outwardly projecting annular flange 18' yieldingly held against the compressible seat 16 and constitutes what may be called a floating seat in that it adjusts itself so that the face of the flange 18 is held in a position substantially at right angles to the axis of rotation of the shaft.

This floating seat has an annular recess 19 which is in its outer face in this instance, the open side of which is closed by the sealing member 20. Recess 19ª is enlarged somewhat to provide seats against which the sealing member 20 is held, having a pressed fit therein. The clearance space behind said ring forms the annular channel 19 through which cooling liquid is caused to circulate in contact with the rear face of said ring. Said ring which is held against rotation by the non-rotatable floating seat in which it is confined, may be made of any hard material capable of providing a smooth flat surface which may be ground and lapped, i. e. it may be made of cast iron, Stellite or any one of a number of other suitable materials.

This non-rotatable seat 20 is engaged by a rotatable sealing ring 21 which may be made of any hard anti-friction material such as lead bronze, carbon or some composition known commercially as Bakelite, Teeplelite, Morganite, and the like. The inner face of this ring is also ground and lapped so that when it is rotating in intimate contact with the ring 20 against which it is yieldingly held, an effective seal is provided which prevents leakage of fluid pressure of any character encountered in practice.

The anti-friction sealing member 21 is yieldingly held in place, as for example, by a helical spring 22 having an abutment or stop 23 secured to the shaft 11 in any conventional manner so as to rotate therewith. The sealing ring 21 and the floating seat 18 have an inner diameter slightly in excess of that of the shaft so as to provide a clearance space. However the invention is adapted to certain types of bellows seals in which a rubber-like bellows is used instead of or in addition to a spring to maintain the pressure. In some types of seals a sealing engagement is maintained between the shaft and the surface of the parts which rotate therewith. The present cooling assembly is adapted to any number of types of seals used heretofore.

In order to permit the circulation of a cooling liquid such as water through the annular cooling chamber 19 suitable ducts 24 are provided having inlet or outlet ports 25 communicating with the space inside of the sealing assembly. For convenient attachment of a nipple or pipe 26 the ports may be screw threaded and are preferably inclined outwardly to facilitate connection with a supply of cooling liquid. Said liquid may for example enter through the pipe 26 shown at the upper side of Fig. 1, and may divide, flowing downwardly through the annular channel 19 and out through a correspondingly located lower pipe 27, thus causing said cooling liquid to contact the inner surface of the seat 20 around the entire periphery thereof.

With the arrangement provided, the non-rotatable anti-friction ring and the seat in which it is mounted is not subject to any misalinement strain in assembling and when under suitable pressure the engaging surfaces will maintain an effective seal. Furthermore, the temperature may be maintained within the desired limits.

Fig. 2 shows a slight modification of the sealing assembly, the same reference characters being employed where the parts correspond to those previously described in Fig. 1. In this form of the invention the stationary sealing ring 30 has an inner shoulder 29 which limits the distance that it may be pressed in the annular opening constituting part of the annular cooling chamber 31. The floating seat which is indicated as a whole by reference numeral 32 is of slightly different configuration from the corresponding seat shown in Fig. 1, but has a corresponding flange 33 which engages the compressible ring 34, the latter providing the same floating seat construction. A suitable nipple 35 is screwed into said seat to provide the necessary inlet having water or other cooling liquid.

In Fig. 3 similar reference characters have been applied also to certain parts. In addition the rubber ring 36 is in the form of a channel and receives an annular flange 37 on the floating seat 38, to yieldingly mount the latter with respect to movement either to the right or the left. This water cooled floating seat with its sealing rings is thus adapted for use in a pump in which the sealing assembly is under either pressure or vacuum. In other words it forms a tight seal whether the floating seat tends to move to the right or to the left. For certain types of service this modification is the preferred construction.

Fig. 4 illustrates a still further modification in which the inlet passageway 40 may be disposed perpendicular to the axis of the shaft 11, instead of parallel thereto as in Figs. 1 to 3.

The floating seat 41 is provided with an annular flange 42 which is seated between rubber rings 43 and 44. The central opening in the seat is enlarged to form a shoulder 46 which defines the position of the sealing ring 47. The latter may be received in the enlarged portion by a press fit, or the seat 41 shrunk around the sealing ring. The seat 41 is undercut to provide an annular cooling chamber 48.

A passageway 49 extends radially through flange 42 and communicates with passageway 40, the latter terminating in an inlet port 50.

A similar arrangement of parts may be provided 180° around the shaft 11 for the outlet. Thus, the cooling fluid entering through passageways 40 and 49 may divide, and flow around the sealing ring 47, and pass out through the correspondingly located outlet.

An advantage of this Fig. 4 construction resides in the fact that the pipe between the inlet port 50 and the source of liquid supply need not possess that flexibility or resiliency which might be desirable in the other embodiments of the invention shown.

The water cooled floating seat and associated parts, described in its several forms, is adapted to a variety of uses. For purposes of illustration it has been shown in connection with centrifugal water pumps, some of which are equipped with a shaft varying from 1¾" to 2½" in diameter, operating under pressures as high as 600 pounds or more and at temperatures as high as 400° F. Said invention, however, is applicable for use in connection with fuel oil, automobile water pumps and valve stems, to mention a few types of service.

Although I have shown only preferred embodiments of my invention, it is understood that various modifications and changes may be made therein without departing from the spirit of my invention. The foregoing description and drawings are deemed to be illustrative only, and the invention is to be limited only by the appended claim.

I claim:

A liquid cooled sealing member for a shaft seal, said shaft seal being adapted to effect a running fluid-tight seal between a shaft and a housing, said sealing member comprising an annular seat having a cylindrical outer surface and an annular chamber and inlet and outlet passages connecting the chamber with the exterior of the seat, a flange extending radially outward from the cylindrical surface, a resilient ring having an interior circumferential groove and adapted to be stretched over the cylindrical surface with the flange extending into the interior groove, and means for securing the resilient ring to the housing against axial movement in either direction.

RAYMOND G. ROSHONG.

REFERENCES CITED

The following references are of record in the file of this patent:

UNITED STATES PATENTS

| Number | Name | Date |
| --- | --- | --- |
| 2,200,413 | Christman et al. | May 14, 1940 |
| 2,112,461 | Kohler | Mar. 29, 1938 |
| 2,252,526 | Shenton | Aug. 12, 1941 |
| 1,821,096 | Hicks et al. | Sept. 1, 1931 |

FOREIGN PATENTS

| Number | Country | Date |
| --- | --- | --- |
| 409,778 | Great Britain | 1934 |
| 361,704 | Great Britain | 1931 |